United States Patent
Korst et al.

(10) Patent No.: US 7,564,639 B2
(45) Date of Patent: Jul. 21, 2009

(54) ENERGY EFFICIENT DISK SCHEDULING FOR MOBILE APPLICATIONS: ADAPTIVELY EXTENDING THE DISK STANDBY TIME

(75) Inventors: Johannes H. Korst, Eindhoven (NL); Joep van Gassel, Eindhoven (NL); Rudi J. Wijnands, Egchel (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 285 days.

(21) Appl. No.: 10/541,054

(22) PCT Filed: Jan. 5, 2004

(86) PCT No.: PCT/IB2004/000016

§ 371 (c)(1),
(2), (4) Date: Jul. 21, 2006

(87) PCT Pub. No.: WO2004/061843

PCT Pub. Date: Jul. 22, 2004

(65) Prior Publication Data

US 2006/0245095 A1  Nov. 2, 2006

Related U.S. Application Data

(60) Provisional application No. 60/438,218, filed on Jan. 6, 2003.

(51) Int. Cl.
*G11B 15/18* (2006.01)
(52) U.S. Cl. ...................................... 360/69
(58) Field of Classification Search ............... None
See application file for complete search history.

(56) References Cited

U.S. PATENT DOCUMENTS

| 4,984,103 | A | * | 1/1991 | Nigam ..................... 360/74.1 |
|---|---|---|---|---|
| 5,493,670 | A | * | 2/1996 | Douglis et al. .............. 713/324 |
| 5,502,700 | A | * | 3/1996 | Shinada ................... 369/47.11 |
| 5,517,649 | A | | 5/1996 | McLean |
| 5,682,273 | A | * | 10/1997 | Hetzler ..................... 713/324 |
| 5,799,197 | A | * | 8/1998 | Juso et al. ................. 713/323 |
| 5,822,288 | A | | 10/1998 | Shinada |
| 5,954,820 | A | * | 9/1999 | Hetzler ..................... 713/323 |
| 6,097,679 | A | | 8/2000 | Ohtaki |

(Continued)

FOREIGN PATENT DOCUMENTS

EP  0649131  4/1995

(Continued)

*Primary Examiner*—K. Wong (57) ABSTRACT

A total amount, M, of memory is allocated over streaming data buffers (86). The memory is partitioned over a set of streams (88), each stream being given a partitioned amount of buffer memory. Scheduling is repeatedly performed during each filling/emptying cycle. The scheduling includes: spinning up a storage disk (80), filling/emptying each stream buffer by reading/writing from/to the storage disk until the respective stream buffer is full/empty, determining an earliest next spinning up time, putting the storage disk in standby mode, spinning down the storage disk, re-determining, at or just prior to the earliest next spinning up time, a new earliest spinning up time based on current buffer fullness, iteratively re-determining the new earliest spinning up time until the time is within a predetermined closeness to the previous time, or within a predetermined closeness to the current time, and waiting until the next earliest spinning up time, or just prior to that time.

13 Claims, 5 Drawing Sheets

U.S. PATENT DOCUMENTS

| | | | |
|---|---|---|---|
| 6,310,848 B1 * | 10/2001 | Ueki | 369/53.37 |
| 6,590,730 B2 * | 7/2003 | Veltchev et al. | 360/69 |
| 7,075,744 B2 * | 7/2006 | Cumpson et al. | 713/323 |
| 7,334,082 B2 * | 2/2008 | Grover et al. | 711/113 |
| 2002/0018410 A1 | 2/2002 | Ueki | |

FOREIGN PATENT DOCUMENTS

| | | |
|---|---|---|
| WO | WO0182301 | 11/2001 |

* cited by examiner

ENERGY EFFICIENT DISK SCHEDULING FOR MOBILE APPLICATIONS: ADAPTIVELY EXTENDING THE DISK STANDBY TIME

CROSS REFERENCE TO RELATED CASES

Applicants claim the benefit of Provisional Application Ser. No. 60/438,218, filed Jan. 6, 2003.

This invention relates to mobile storage devices utilizing disk-based storage for storing and reading personal multimedia content when a user is on the move, and particularly to methods of energy-efficient disk scheduling.

Mobile storage devices are currently the preferred solution to realize easy access to personal multimedia content when on the move, and they are likely to remain important in the near and medium future due to reasons of cost and reliability.

Portable storage devices that only contain solid-state memory are severely restricted in storage capacity and are relatively expensive in terms of cost per megabyte (Mbyte). Disk-based storage remains an important alternative, especially for the storage of video data. Even 1 gigabyte (Gbyte) of memory is not enough to store half an hour of 6 megabit/s (Mbit/s) video. Magnetic and optical disks offer a large storage capacity at a low cost per Mbyte.

For mobile storage devices, low power consumption is of utmost importance, since battery life is one of the key differentiating features of such products. The rotation of magnetic and optical disks accounts for a substantial part of the total energy usage. Consequently, it is important to use a disk intelligently by saving energy whenever possible. A well-known strategy that is often used in current MP3 players is to buffer repeatedly enough data in solid-state memory to be able to put the disk in standby mode, i.e., the mode where it stops spinning, for several minutes when possible.

For mobile applications, it is not expected that many streams will have to be handled in parallel. However, when using multi-layered encoding of audio or video, a single video stream is typically partitioned into multiple sub-streams, one base layer and possibly multiple enhancement layers. These sub-streams are typically handled as separate streams by the disk, i.e., stored at separate locations, to allow efficient playback at a lower than maximum quality and to allow efficient deletion of the highest enhancement layers.

When the disk is in standby mode, the disk stops rotating and some parts of the electronics are not powered, which saves energy. Another method of saving energy is to reorder disk accesses and increase request sizes such that less energy is spent on performing seek operations. Of these two, making efficient use of standby mode offers the greater opportunity to save energy. Additionally, a standby strategy can be adapted to cases where the disk is used for handling multiple variable-bit-rate streams.

For applications and trends in portable multimedia storage, refer to Bodlaender et al. [2002], Jonker et at. [2002] and Van Houten [2000]. For an analysis of the power consumption of portable hard disks, refer to Cumpson [2001]. Saving energy in portable multimedia storage seems an area of research that, so far, has received little attention in the literature. Adaptive power management has been considered extensively for magnetic disks in notebook computers, see e.g. Douglish and Marsh [1993], Douglish et al. [1994, 1995], and Li et al. [1994]. But the solutions proposed seem less suited for real-time multimedia applications.

There is, therefore, a need for improved strategies for using disks in an energy-efficient way, particularly in mobile storage devices.

There is a particular need for the improved energy-saving strategies to be compatible with, and effective, in applications where multiple streams are handled in parallel.

In accordance with one aspect of the present invention, a battery powered device is provided for reading and storing streaming data, including: a disk memory (80), a means (82) for rotating the disk memory, a read/write means (84) for reading or writing the streaming data from or to the disk memory, a buffer memory (86) for storing the data read from or to be written to the disk memory, and an energy efficient scheduling means (96) for monitoring the buffer memory and controlling the disk memory rotating means in accordance with the monitored buffer memory.

An energy efficient disk scheduling method is provided. The method includes reading and/or writing streaming data from/to a disk memory and buffering the data that is being read from or written to the disk memory. The method also includes monitoring the buffered data and scheduling rotation of the disk memory in accordance with the monitored, buffered data.

One advantage of the present invention is reduced energy usage in mobile devices and longer battery life.

Another advantage of the present invention is it can be easily and inexpensively be incorporated in portable multimedia storage devices.

Still further advantages will be apparent to those of ordinary skill in the art upon reading and understanding the following detailed description.

The invention may take form in various parts and arrangements of parts. The drawings are only for purposes of illustrating a preferred embodiment and are not to be construed as limiting the invention.

In order to develop effective energy-saving strategies with respect to efficient use of standby mode, a method for modeling streams and disks is considered. In particular, both constant-bit-rate and variable-bit-rate streams are considered.

An audio/video stream is stored on disk in a digital compressed form and often has a variable bit rate. A stream i is characterized by a playout rate $r_i(t)$, for $t \in [0,l_i]$, where t represents time and $l_i$ gives the duration of the corresponding audio/video content. In the following description, two types of streams are considered, constant-bit-rate (CBR) and variable-bit-rate (VBR) streams. For CBR streams, $r_i(t)=r_i$ for all $t \in [0,l_i]$. For VBR streams complete knowledge of $r_i(t)$ is not assumed. Instead, only an upper bound $r_i^{max}$ is assumed to be known, with $r_i^{max} \geq r_i(t)$ for all $t \in [0,l_i]$.

Although the preferred embodiment is described in reference to magnetic disks, it will be appreciated that the invention is also applicable to optical and other disks. For a general introduction to the working of magnetic disks, refer to Ruemmler & Wilkes [1994]. The rate at which data is read from or written to disk is given by $r_{disk}$. This rate is assumed constant irrespective of the location where the data is read from or written to. With respect to its power use, a magnetic disk can be in several modes which can be subdivided into two global states: active or inactive. When active, the disk reads, writes, performs seeks, or encounters rotational delays. When inactive, the disk can be either in idle or in standby mode. When idle, the disk is spinning and waiting for access requests to arrive. With respect to energy usage, multiple idle modes are sometimes defined. These modes differ in whether or not the disk heads are loaded or unloaded, and whether or not some parts of the electronics are powered on or off. In order not to complicate the analysis herein, it is assumed that there is only one idle mode. When the disk is in standby mode, the disk is not spinning. In this analysis, the time for spinning down and spinning up the disk is considered part of the time that the disk is in standby mode.

In addition, the following simplifications are made. It is assumed that all streams are playback streams and that seek times and rotational delays are zero, except when round-robin disk scheduling is discussed. In practice, they do take time, but compared to the standby times that typically amount to at least a minute, they are negligibly small.

The following discussion describes a basic standby strategy that can be adapted to the case where a disk has to handle multiple data streams, assuming that the refilling of single buffers is not preempted. The global objective in applying standby strategies is to maximize the average energy saved per time unit.

Figure 1:
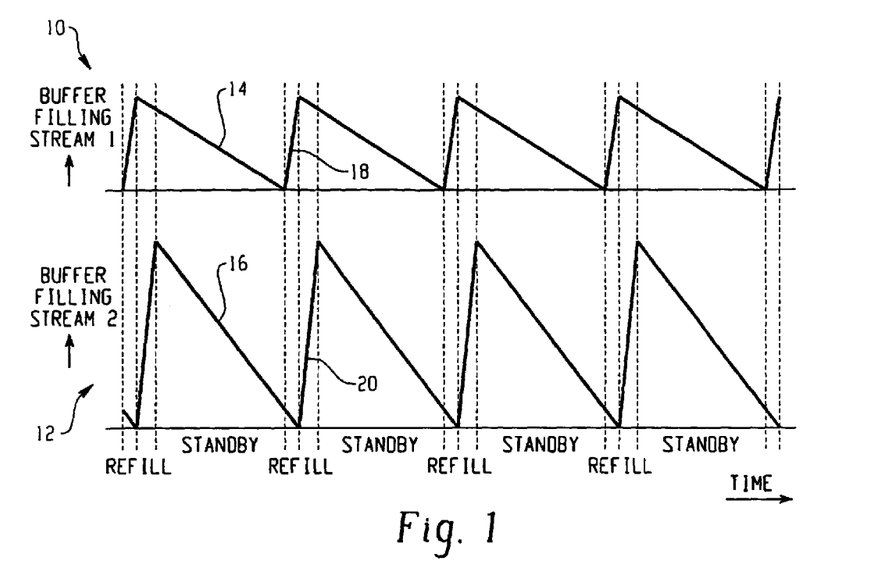
FIG. 1 is a diagram of buffer refill/standby intervals in accordance with the present invention.

Suppose there are n constant-bit-rate streams, numbered 1,2, . . . ,n. The buffers of the streams are repeatedly refilled in a round-robin fashion, i.e., in a fixed order, say, first stream 1, then stream 2, etc. After refilling the buffers, the disk is put in standby mode. FIG. 1 gives the buffer filling as a function of time for two streams 1 (10) and 2 (12) with $r_2=2r_1$. The magnitude of the slopes of the downward sloping standby portions (14,16) of streams 1 and 2 corresponds to $r_1$ and $r_2$ respectively. Buffer refilling rates correspond to the upward slope of the refill sections (18,20).

For a stream i, the buffer filling increases at a rate $r_{disk}-r_i$ during refilling, and it decreases at a rate $r_i$ otherwise. Let the size of the buffer for stream i be given by $b_i$, then the time that is required to refill the buffer of stream i is given by $b_i/(r_{disk}-r_i)$, and the time that it takes to empty the buffer is given by $b_i/r_i$. To optimally use the memory that is available for buffering, it follows that, for each pair i,j of streams, $$\frac{b_i}{r_{disk}-r_i} + \frac{b_i}{r_i} = \frac{b_j}{r_{disk}-r_j} + \frac{b_j}{r_j}. \tag{1}$$

Figure 2:
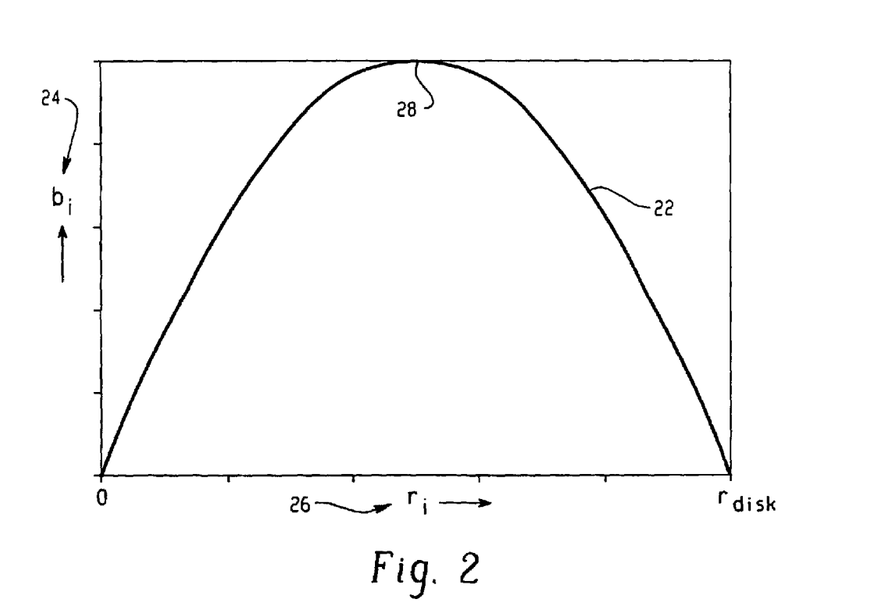
FIG. 2 is a graph of buffer size as a function of disk rate in accordance with the present invention.

If this condition is not met, some buffers will have to be refilled before they are empty, if underflow for others is to be avoided. Note that Equation 1 implies that the buffer sizes are not proportional to the respective bit rates; cf. Korst et al. [1998]. For a stream i with rate $r_i > r_{disk}/2$, the required buffer size $b_i$ actually decreases when $r_i$ increases. FIG. 2 illustrates a relation (22) of $b_i$ (24) as a function of $r_i$ (26) where an inflection (28) is shown at $r_i=r_{disk}/2$.

Consideration is now made as to whether or not energy is actually saved by repeatedly putting the disk in standby mode. If the disk is put in standby mode, additional energy is needed to spin down the disk at the start of a standby interval and additional energy is needed to spin up the disk at the end of the standby interval. Energy is only saved if this additional energy is offset by the energy that is saved during the time that the disk is in standby mode. Otherwise, the disk should preferably remain in idle mode.

Let $P_{idle}$, and $P_{standby}$ be the power usage of the disk in idle and standby modes, respectively, where, clearly, $P_{standby} < P_{idle}$. The energy that is saved per unit time if the disk is in standby mode, instead of in idle mode, is given by $\Delta P = P_{idle} - P_{standby}$. Furthermore, let E be the additional energy that is required for spinning the disk down and up once, and let p be the duration of a complete refill-standby cycle. The amount of data that is read for stream i in each cycle is given by $p \cdot r_i$. Hence, the total amount of data read in a cycle is given by $p \cdot \Sigma_j r_j$. Reading this amount of data requires $p \cdot \Sigma_j r_j / r_{disk}$ time. The time that remains for standby per cycle is thus given by $p - p \cdot \Sigma_j r_j / r_{disk} = p \cdot (1 - \Sigma_j r_j / r_{disk})$. Hence, the total amount of energy saved when in standby mode for one cycle is given by $p \cdot (1 - \Sigma_j r_j / r_{disk}) \cdot \Delta P$, and the break-even point is obtained if this amount equals E. The following lemma can now be proved.

Lemma 1. Let m be the amount of memory that is available for buffering, and which is optimally divided over the streams. Then putting the disk in standby mode saves energy if and only if $$m > \frac{\sum_j r_j \cdot (r_{disk} - r_j)}{r_{disk} - \sum_j r_j} \cdot \frac{E}{\Delta P} \tag{2}$$

Proof. Since the amount m of memory is optimally divided over the streams, $p = b_i/r_i + b_i/(r_{disk}-r_i)$ for each stream i. In other words, $p = b_i \cdot \alpha_i$ for each stream i, where $\alpha_i = r_{disk}/(r_i \cdot i_{disk} - r_i^2)$. Because $m = \Sigma_j b_j$, it follows that $m = p \cdot \Sigma_j \alpha_j^{-1}$. Hence, the time that remains for the disk to be in standby mode can be rewritten as $m/\Sigma_j \alpha_j^{-1} \cdot (1 - \Sigma_j r_j / r_{disk})$. During this time, $\Delta P$ per time unit is saved. Hence, energy is saved if and only if $\Delta P \cdot m/\Sigma_j \alpha_j^{-1} \cdot (1 - \Sigma_j r_j / r_{disk}) > E$.

Rewriting the above gives Equation 2.

Note that nothing was assumed about the time that is required to spin down the disk and the time to spin up the disk. Clearly, the disk has to spin up in time to be able to start refilling at the appropriate time. It is assumed herein that the break-even point is large enough to include the spin-down and spin-up times.

Considered now is the case for n VBR steams, where, for each stream i, only an upper bound $r_i^{max}$ is known, for which $r_i^{max} \geq r_i(t)$ for all $t \in [0,l_i]$. The buffer sizes can be chosen in a similar fashion as explained previously, where, in the calculations, the upper bound $r_i^{max}$ is used, instead of the constant rate $r_i$.

On average, the bit rate of a stream i is smaller than $r_i^{max}$. It therefore makes sense not to stick to a fixed duration of the standby time but, instead, to check the buffer fillings again just before spinning up is originally scheduled. Based on these buffer fillings the latest possible refill intervals are updated. In this way, the standby time can usually be extended. Analyzing the buffer fillings at a time t, a new point in time is determined at which refilling should start as follows. Given the buffer filling $f_i(t)$ of stream i at time t, the latest possible refill interval for stream i at time t is defined as $$\left[ t + \frac{f_i(t)}{r_i^{max}}, t + \frac{f_i(t)}{r_i^{max}} + \frac{b_i}{r_{disk} - r_i^{max}} \right).$$

Assuming that the rate of stream i will be equal to $r_i^{max}$ before and during this interval. Note that latest possible refill intervals for the different streams may overlap in time, and gaps may occur between the intervals due to the variability of the bit rates.

To avoid overlap or to remove gaps, some of the refill intervals will have to be advanced, i.e., scheduled earlier in time. By advancing a refill interval, less data will have to be read, and consequently, the length of the refill interval decreases. The following lemma explains how the length of a refill interval is affected.

If a given refill interval $[s_i, e_i)$ is advanced by decreasing its end time $e_i$ by $\delta_e$, then the duration of the refill interval decreases with an amount $$\delta_e \cdot \frac{r_i^{max}}{r_{disk}}. \quad (3)$$

Alternatively, if the refill interval is advanced by decreasing its start time $s_i$ by $\delta_s$, then the duration of the refill interval decreases with an amount $$\delta_s \cdot \frac{r_i^{max}}{r_{disk} - r_i^{max}}. \quad (4)$$

Proof. The latter result is proved first with reference to FIG. 3. If $s_i$ (30) is advanced by $\delta_s$ time units (32), then an amount of $\delta_s \cdot r_i^{max}$ (34) is in the buffer when refilling starts. Consequently, the refill time decreases by an amount $\delta_s \cdot r_i^{max}/(r_{disk} - r_i^{max})$. Alternatively, if $e_i$ is advanced by $\delta_e$ time units (36), then the decrease in the refill interval is proved by a simple geometric argument. The time t (38) at which refilling starts will be between $s_i - \delta_e$ and $s_i$, more precisely, t is the point at which the line (40) starting at $(s_i - \delta_e, 0)$ (42) with slope $r_{disk} - r_{imax}$ crosses the line (44) that ends at $(s_i, 0)$ (30) with slope $-r_i^{max}$. Consequently, t is given by $s_i - \delta_e \cdot (r_{disk} - r_i^{max})/r_{disk}$, and the decrease in the refill interval can be expressed as $t - (s_i - \delta_e)$ which is given by $\delta_e \cdot r_i^{max}/r_{disk}$.

Figure 3:
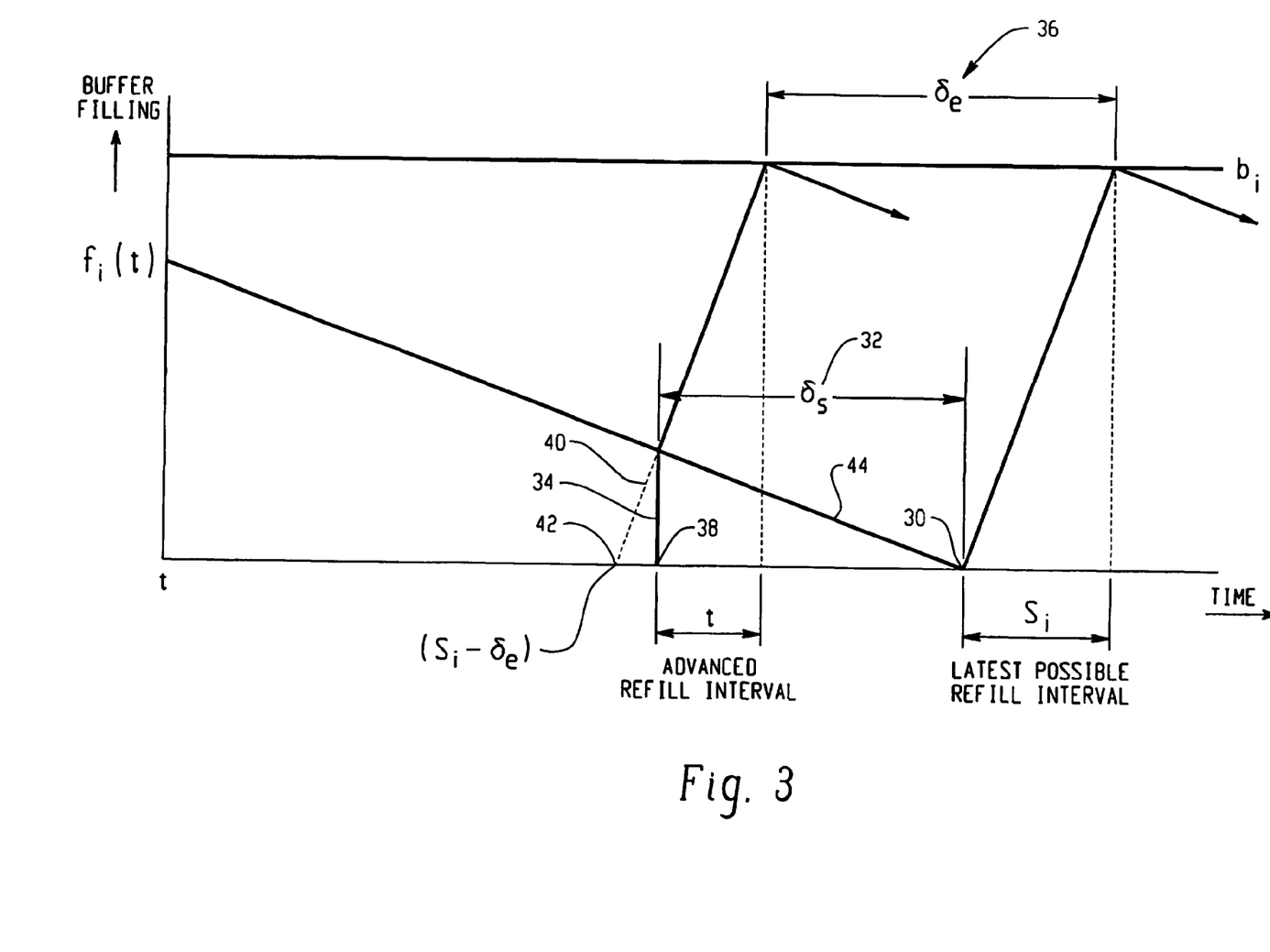
FIG. 3 is a diagram illustrating refill interval advancement in accordance with the present invention.
Figure 4:
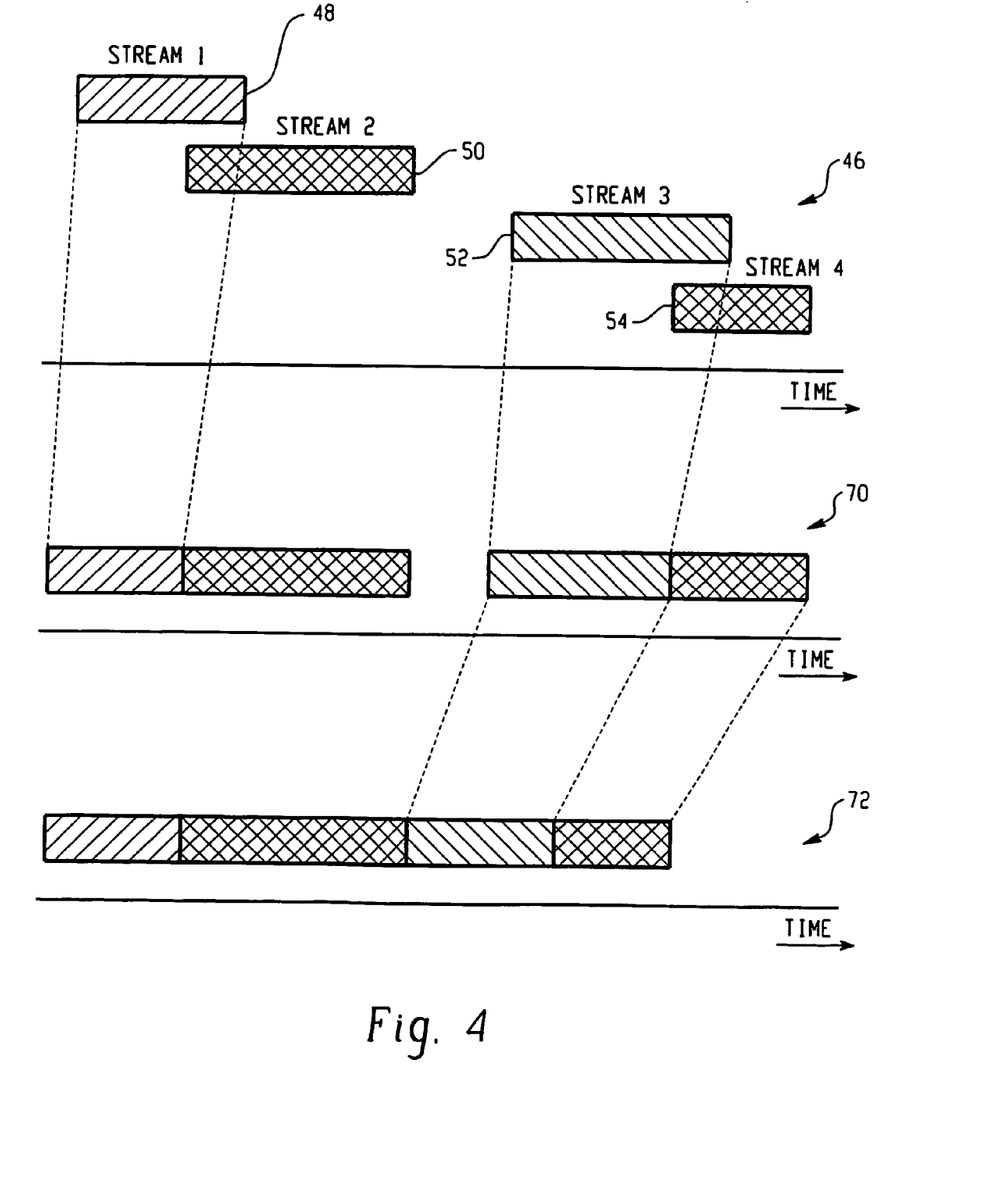
FIG. 4 is diagram illustrating the Back-Front-Back method in accordance with the present invention.

Note that for avoiding overlap the end time of a refill interval is decreased by a given amount, while for removing gaps the start time of a refill interval is decreased by a given amount. FIG. 3 gives an example of an advanced refill interval. FIG. 4 gives an example where, in the top part (46), the latest possible refill intervals (48, 50, 52, 54) are given for streams 1, 2, 3, and 4.

Figure 5:
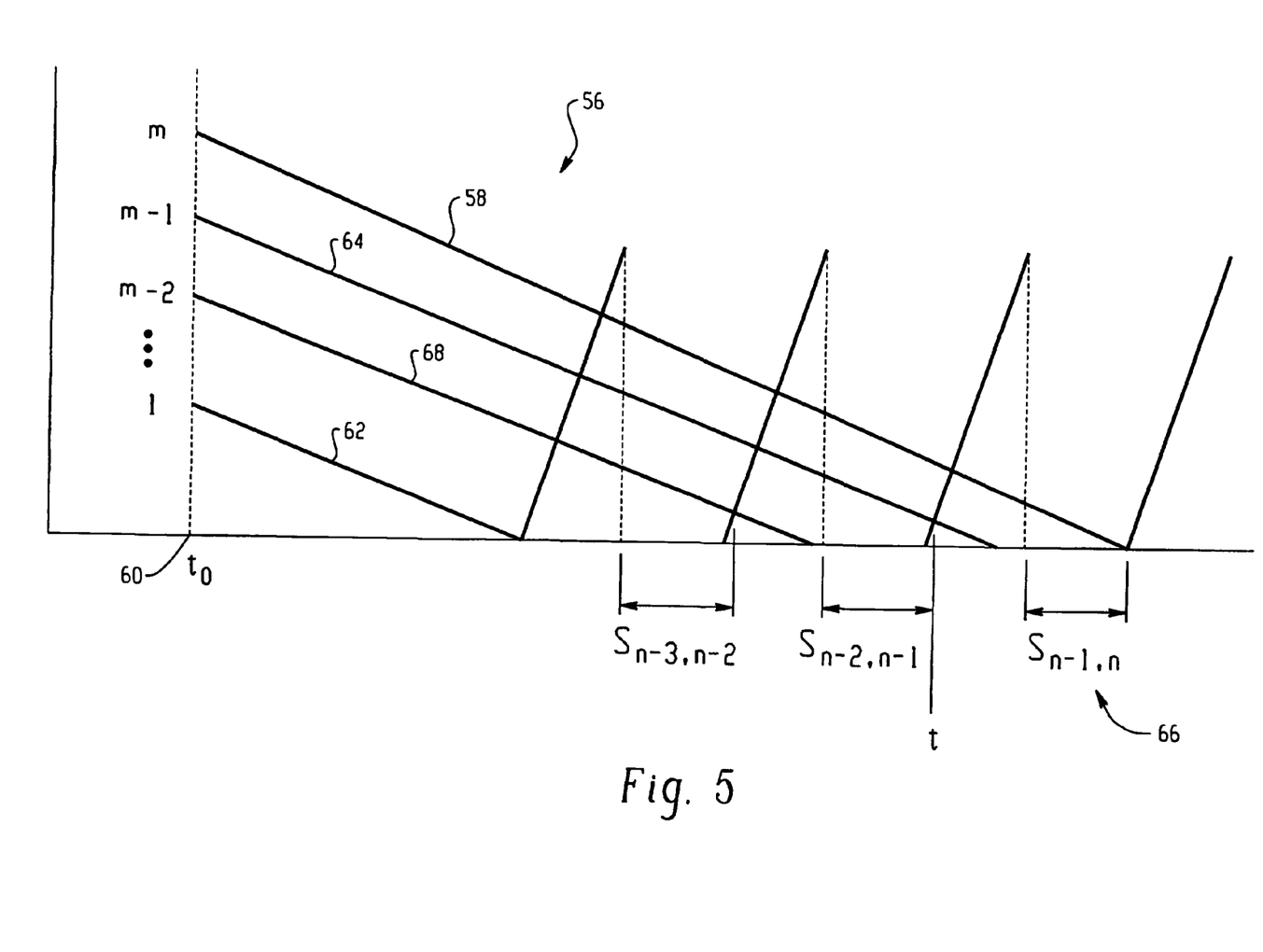
FIG. 5 is a diagram illustrating round=robin scheduling in accordance with the present invention.

Round-robin disk scheduling is readily implemented in a portable storage device, with repeated standby periods. Some basic assumptions are made with respect to round-robin scheduling, as shown in FIG. 5. For one, the disk services a given set S of n streams (56), where the streams are numbered 1, 2, ..., n. For each stream i, a maximum bit rate $r_i^{max}$ is given. For each time t, the data read from or written to disk is, at most, equal to $r_i^{max}$. The guaranteed bit rate of the disk is given by $r_{disk}$. Clearly, in order to guarantee service to the given set of streams $\Sigma_{i \in S} r_i^{max} < r_{disk}$, and some form of admission control guarantees that this is the case. For ease of explanation, it is assumed without loss of generality that all data streams are reading from disk.

Now, repeatedly, blocks of data are read for the streams in batches, where, in between handling successive batches, the disk is put in standby mode, provided that the standby time is guaranteed to last long enough to justify spinning down the disk.

The buffers for the streams are chosen proportional to their respective maximum bit rates. Assuming that S is not extended, the total amount m of memory that is available for buffering data of the streams is partitioned over the various streams, such that stream i is given an amount of $r_i^{max} M/\Sigma_{j \in S} r_j^{max}$. Alternately, if an expected average bit rate of each stream is known, the memory may be partitioned over the streams according to $r_i^{avg} M/\Sigma_{j \in S} r_j^{avg}$ to further improve energy savings, where $r_i^{avg}$ represents the expected average bit rate of stream i.

The buffers are repeatedly refilled in a fixed order as follows. The disk spins up and first serves stream 1, then stream 2, etc. After refilling the buffer of stream n (58), the disk is potentially put in standby mode. Before putting the disk in standby mode, it is determined at what time the disk should be spun up again, to guarantee that the buffers of all the streams will not underflow. This time is based on maximum bit rates of the streams. The time between refilling a given buffer is at least $M/\Sigma_{j \in S} r_j^{max}$. So, in the worst case, if all streams consume at their maximum bit rate, the batches are handled exactly once every $M/\Sigma_{j \in S} r_j^{max}$ time units. On average, the data is consumed from a buffer at a lower rate than given by the maximum bit rate of that stream. Let $t_0$ (60) be the time at which the disk spins up in a worst-case situation, such that filling the buffer of stream 1 (62) starts in time to avoid buffer underflow for all streams.

At, or just before $t_0$, the amount of data in the respective buffers is examined again, and it is determined whether the standby time can be extended, given the current buffer fillings. This is done as follows. Let $f_i(t)$ denote the amount of data in the buffer of stream i at time t. Then, the earliest deadline for each stream i to refill its buffer is given by $t_0 + f_i(t_0)/r_i^{max}$. For the last stream (58), i.e. stream n, the deadline is then $t_0 + f_n(t_0)/r_n^{max}$. It should not be necessary to start refilling the buffer of stream n before this time. Similarly, refilling the buffer of stream n−1 (64) can be delayed until $t_0 + f_{n-1}(t_0)/r_{n-1}^{max}$, provided that this does not result in buffer underflow for stream n (58). Let $s_{n-1,n}$ (66) denote the time required for switching, i.e. seek time and rotational delay, between refilling for stream n−1 (64) and refilling for stream n (58). To avoid buffer underflow for stream n, refilling the buffer for stream n should start at $t_0 + f_n(t_0)/r_n^{max}$, and, consequently, refilling for stream n−1 should be completed at time $t_0 + f_n(t_0)/r_n^{max} - s_{n-1,n}$. And, assuming that an amount of data is read in a buffer for which there is already room at the start of the refill, refilling for stream n−1 lasts, at most, $(M \cdot r_{n-1})/(\Sigma_j r_j^{max} \cdot r_{disk})$ units of time. Hence, whenever $t_0 + f_n(t_0)/r_n^{max} - s_{n-1,n} - (M \cdot r_{n-1})/(\Sigma_j r_j^{max} \cdot r_{disk})$ is less than $t_0 + f_{n-1}(t_0)/r_{n-1}^{max}$, refilling for stream n−1 will start before $t_0 + f_{n-1}(t_0)/r_{n-1}^{max}$. To be more precise, it will have to start at time t for which $f_{n-1}(t_0) - (t - t_0) r_{n-1}^{max} = (t - t') r_{disk}$, with $t' = t_0 + f_n(t_0)/r_n^{max} - s_{n-1,n} - (M \cdot r_{n-1})/(\Sigma_j r_j^{max} \cdot r_{disk})$.

FIG. 5 illustrates how the start time for refilling the buffer for stream n−1 (64) is advanced by the start time for refilling the buffer for stream n (58). At time $t_0$ (60), the buffer fillings for the successive streams are shown, stream n (58) having the most data in its buffer, then stream n−1 (64), etc. To calculate the latest possible time to spin up the disk in time, it is next assumed that each stream consumes data from its buffer at its respective maximum bit rate.

In the same way, the earliest time that buffer refill will be called upon to start for stream n−2 (68) can now be determined, given the earliest refill time for stream n−1, etc., until an updated spin-up time can be derived for the disk. Calling this time $t_1$, again, at or just before $t_1$, a new updated earliest spin-up time can be determined, based on the buffer fillings at time $t_1$. This procedure is repeated until, for iteration k, time $t_k$ is very close to the previous value $t_{k-1}$. Only then is spinning up the disk started. When the disk is spun up, then all streams can be refilled one after the other, without intermediate pausing. Alternatively the system may pause between refilling two successive streams i and i+1, provided that all subsequent streams i+1,i+2, . . . ,n can be delayed.

It is clear also that the order in which the streams are served can be adapted to the actual buffer fillings of the streams. If stream 1 consumes from its buffer at a much smaller rate than given by its maximum rate $r_1^{max}$, then the standby period can possibly be extended by reordering the order in which the buffers are refilled in the next batch. This can be done as follows. First, the above procedure is quickly followed to determine at time $t_i$ the next updated spin-up time $t_{i+1}$, assuming that no reordering is used. In the time between $t_i$ and $t_{i+1}$, a heuristic procedure can be used to check whether an alternative ordering of the streams in the next batch results in a larger value for $t_{i+1}$, still using the buffer fillings as they were at time $t_i$. If so, this new order is assumed, and the process of looking for further improvements is continued until the current value of $t_{i+1}$ is reached. The heuristic procedure can take into account the earliest deadlines of the streams, i.e. the earliest moment that buffer underflow can occur, as well as the seek times and rotational delays between the respective positions on the disk that have to be visited for the next read access for the streams.

The objective in ordering the refill intervals is to extend the current standby time as long as possible, i.e., to order the refills such that the first refill is started as late as possible. This gives the following problem statement.

Given are a disk with rate $r_{disk}$ and a set of streams, where for each stream i, the maximum bit rate is given by $r_i^{max}$, and the latest possible refill interval is given by $[s_i,e_i)$. Find an ordering of the refill intervals, such that refilling is started as late as possible.

The refill ordering problem has been shown to be NP-hard, i.e., it is unlikely that a polynomial-time algorithm exists that solves it to optimality. In practice, for mobile storage devices, the number of streams will be quite small, and consequently an exhaustive search is usually doable. To quickly determine a reasonable lower bound on the time that refilling will have to start, the following heuristic algorithm, called Back-Front-Back (BFB), schedules the refills for the various streams. The primary objective is to start refilling the buffers as late as possible, while guaranteeing that buffer underflow is avoided.

The BFB algorithm proceeds in two steps. In the first step, the latest possible refill intervals are examined from back to front, i.e., in order of non-increasing end time. In the example of FIG. 4, first stream 4, then steam 3, etc. If a refill interval $[s_i,e_i)$ starts earlier than the end of a preceding refill interval $[s_j,e_j)$, i.e., if $e_j>s_i$, then this preceding refill interval is advanced over a time $e_j-s_i$. By starting a refill earlier, less data is read, so this decreases the length of the refill interval, as discussed above. The result is shown in the middle part (70) of FIG. 4.

In the second step, the resulting refill intervals are again examined but now from front to back to remove any remaining gaps. These gaps have an adverse effect on the possible standby time, and they may grow in successive cycles if they are not deleted. So, all refill intervals behind a gap are moved forward in time, again resulting in shorter refill intervals. The result of this second step is shown in the bottom part (72) of FIG. 4.

Note that by removing gaps, at the end of a refill batch, i.e., at the time that the disk is spun down again, the buffers are at least as full, since the time between ending the refill for a stream and spinning down the disk does not increase and possibly decreases. Thus, removing gaps generally increases the duration of the next standby interval.

The BFB algorithm can be repeatedly applied in a single refill-standby cycle. Based on updated information on the buffer fillings, the standby time can be repeatedly extended, until the expected remaining standby time approaches the time for spinning up the disk.

In the preceding discussion, it was assumed that the buffers for the various streams are refilled one after the other. In addition, it was assumed that refilling for one stream is continued until the buffer is completely filled. A disadvantage of this approach is that some of the buffers will not be completely filled at the start of a standby interval.

Consideration is now made as to what can be gained if preemptive refilling is allowed. Assuming that seek times and rotational delays are zero, all buffers can be refilled in parallel by adding small quantities to each of the buffers in a round-robin fashion. For convenience, focus is on CBR streams, but preemptions can also be applied to VBR streams.

It is assumed that the buffers are filled in such a way that they are completely filled at approximately the same time. In addition, the buffer sizes are chosen in such a way that completely emptying the buffers requires the same time for all streams. Consequently, $b_i=m \cdot r_i/\Sigma_j r_j$ is chosen, and the time that the disk can be in standby mode is thus given by $b_i/r_i=m/\Sigma_j r_j$.

At the end of the standby interval all buffers will be empty, and refilling for all streams is assumed to start simultaneously. To obtain that all buffers are filled again at the same time, the refill time must also be equal for all streams. Let $\beta_i$ be the fraction of the disk rate $r_{disk}$ that is spent on refilling the buffer for stream i, with $\Sigma_j \beta_j=1$. To obtain that all buffers are refilled at the same time, $\beta_i=r_i/\Sigma_j r_j$. Consequently, the refill time is given by $m/(r_{disk}-\Sigma_j r_j)$.

For a given set of n streams, let f be the fraction of time that has to be spent on refilling, i.e., $f=\Sigma_j r_j/r_{disk}$. Then, by using preemptive refilling instead of non-preemptive refilling, the standby time can increase by a factor of $$\frac{1-f/n}{1-f}. \qquad (5)$$

Proof. The standby time for non-preemptive refilling is given by $$m \cdot \frac{\left(r_{disk}-\sum_j r_j\right)}{\left(\sum_j r_j(r_{disk}-r_j)\right)}.$$

Dividing $m/r_j$ by this expression gives the fraction $$\frac{\sum_j r_j(r_{disk}-r_j)}{\sum_j r_j \cdot \left(r_{disk}-\sum_j r_j\right)}.$$

This fraction is maximal if there are n identical streams, i.e., $r_j=f \cdot r_{disk}/n$ for each stream j. In that case, the required result is produced.

Table 1 gives an indication of the increase that can be maximally obtained for n=2 and n→∞.

TABLE 1

The maximum attainable increase of a standby interval using preemptive refilling instead of non-preemptive refilling, for n = 2 and n → ∞, for different values of f.

| | maximum attainable increase of a standby interval (%) | | | | | | | | | |
|---|---|---|---|---|---|---|---|---|---|---|
| n | f = 0.1 | f = 0.2 | f = 0.3 | f = 0.4 | f = 0.5 | f = 0.6 | f = 0.7 | f = 0.8 | f = 0.9 | f → 1 |
| 2 | 5.6 | 12.5 | 21.4 | 33.3 | 50.0 | 75.0 | 116.7 | 200.0 | 450.0 | ∞ |
| ∞ | 11.1 | 25.0 | 42.8 | 66.7 | 100.0 | 150.0 | 233.3 | 400.0 | 900.0 | ∞ |

In practice, seek times and rotational delays are not zero. Consequently, the refill time will grow with a fraction that is slightly larger than that of the standby time. This may partly nullify the advantage of preemptive refilling.

Experiments indicate that power usage when reading or writing does not depend on the location where data is read or written. But, since the transfer rate at the outermost zone may be 50% to 100% larger than at the innermost zone, the energy used for reading or writing a file at the outermost zone may be 50% to 70% smaller than when read or written at the innermost zone. This offers an additional source of energy saving.

Files that are frequently used when on the move are preferably stored on the outer zones to reduce battery drain and preserve energy. Files that are used less frequently when on the move are stored in the inner zones. Files that are frequently used, but only when connected to a power supply, need not be stored on the outer zones.

In addition, files that are recorded when on the move can first be stored on the outermost zones, to save energy. Later, when connected to a power supply, these files can be moved to the inner zones, when they are accessed less often when on the move.

To give an impression of the possible energy savings, a number of settings are considered and the amount of energy that can be saved in each setting is shown.

A Toshiba MKIOO3GAL 1.8 inch disk drive, for example, has the following characteristics. The sustainable disk rate at the innermost zone of the disk is $r_{disk}$=72 Mbit/s. The sustainable rate at the outermost zone is 120 Mbit/s. The power consumptions of writing, reading, idle and standby modes are given by $P_{write}$=1.4 J/s, $P_{read}$=1.4 J/s, $P_{idle}$=0.6 J/s, and $P_{standby}$=0.2 J/s. The energy for spinning down and spinning up is given by E=3.65 J. The time required for spinning down and spinning up the disk is given by 0.6 s and 2.5 s, respectively. Hence, ΔP=0.4 J/s, and the break-even point is approximately 9 s.

It is first assumed that a single CBR stream of 6 Mbit/s is to be played back. If there is only one stream, then $b_i$=m for this stream. For different values of m, Table 2 provides lower and upper bounds on the energy saving that is realized by repeatedly putting the disk in standby mode, as a fraction of the energy usage when no standby is used. The lower bound is attained if the data is always read from the innermost zone; the upper bound is attained if the data is always read from the outermost zone. The duration of a refill-standby cycle scales linearly with m, and ranges from 11.6 s for m=8 Mbyte to approximately 25 minutes for m=1 Gbyte.

Note that for m→∞, the energy reduction converges to $$\frac{(1-f) \cdot (P_{idle} - P_{standby})}{(1-f) \cdot P_{idle} + f \cdot P_{read}}, \quad (6)$$

where $f=\Sigma_j r_j/r_{disk}$. For a VBR stream with $r_j^{max}$=6 Mbit/s, the energy savings for a given memory size m are at least as high as given for a CBR steam, since the standby intervals will generally be larger. The actual savings greatly depend on the difference between $r_j^{max}$ and the average bit rate.

Attention is now directed toward multiple streams to see how much energy is saved. It is assumed that there are n CBR streams, each of 6 Mbit/s. Since identical bit rates are assumed, the buffer for each stream is given by m/n. Hence, the duration p of a refill-standby cycle is given by $m/(n \cdot r_{disk} - n \cdot r_i) + m/(n \cdot r_i)$. Consequently, for a fixed amount m of memory, the cycle time p is inversely proportional to n. Table 3 gives lower and upper bounds on the energy reduction for one up to five streams, for different memory sizes.

TABLE 2

For a single playback stream the fraction of energy that can be saved as a function of the available memory for buffeting, both for reading from the innermost zone and reading from the outermost zone of the disk.

| m (Mbyte) | energy reduction (%) (innermost zone) | energy reduction (%) (outermost zone) |
|---|---|---|
| 8 | 8.0 | 8.6 |
| 16 | 31.5 | 34.0 |
| 32 | 43.2 | 46.7 |
| 64 | 49.1 | 53.0 |
| 128 | 52.1 | 56.2 |
| 256 | 53.5 | 57.8 |
| 512 | 54.3 | 58.6 |
| 1024 | 54.6 | 59.0 |
| ∞ | 55.0 | 59.4 |

The standard firmware of the Toshiba disk drive switches from idle mode to low-power idle mode when no requests have been issued to the disk during 15 seconds. For the disk, the power usage for low-power idle mode is 0.4 J/s. Comparing repeatedly going into standby mode with repeatedly going into low-power idle mode after 15 seconds, the lower and upper bounds on the energy reduction for m→∞ are 37.9-42.2%, 29.4-36.0%, 23.1-30.9%, 18.2-26.7%, and 14.3-23.1% for one to five streams respectively.

TABLE 3

For one to five streams, lower and upper bounds on the energy reduction as a function of the available memory for buffering are given, assuming that reading is only from the innermost or outermost zone of the disk, respectively.

| m (Mbyte) | lower and upper bounds on energy reduction (%) | | | | |
|---|---|---|---|---|---|
| | n = 1 | n = 2 | n = 3 | n = 4 | n = 5 |
| 8 | 8.0-8.6 | — | — | — | — |
| 16 | 31.5-34.0 | 2.7-5.2 | — | — | — |
| 32 | 43.2-46.7 | 24.1-29.1 | 8.1-13.4 | — | — |

TABLE 3-continued

For one to five streams, lower and upper bounds on the energy reduction as a function of the available memory for buffering are given, assuming that reading is only from the innermost or outermost zone of the disk, respectively.

| m (Mbyte) | lower and upper bounds on energy reduction (%) | | | | |
|---|---|---|---|---|---|
| | n = 1 | n = 2 | n = 3 | n = 4 | n = 5 |
| 64 | 49.1-53.0 | 34.8-41.0 | 22.8-30.3 | 12.7-20.7 | 0.4-12.1 |
| 128 | 52.1-56.2 | 40.1-47.0 | 30.2-38.8 | 21.7-31.4 | 14.5-24.8 |
| 256 | 53.5-57.8 | 42.8-50.0 | 33.8-43.0 | 26.2-36.8 | 19.8-31.2 |
| 512 | 54.3-58.6 | 44.1-51.4 | 35.7-45.1 | 28.5-39.4 | 22.4-34.3 |
| 1024 | 54.6-59.0 | 44.8-52.2 | 36.6-46.2 | 29.6-40.8 | 23.7-35.9 |
| ∞ | 55.0-59.4 | 45.5-52.9 | 37.5-47.2 | 30.8-42.1 | 25.0-37.5 |

A number of strategies have been considered herein for saving energy in portable disk-based storages devices. The examples indicate that the savings are substantial. The energy saved depends on a number of parameters, of which the amount of memory that is available for buffering is an important one. In designing portable disk-based storage devices, it is worthwhile to be generous in the amount of solid-state memory, since large memories lead to more energy saving and longer battery lives.

The methods and strategies for saving energy in portable devices have been described with respect to buffers that are being emptied, when e.g. a video is being played back from the hard drive. In play-back situations, the buffers empty at their respective bit rates, $r_i$, and are refilled at a rate equal to the difference between the disk rate (reading) and the play-back bit rate, $r_{disk}-r_i$. It should be readily apparent that the same methods and strategies are equally applicable to recoding scenarios, e.g. when a video is being recorded to the hard drive for later playback. The recording methods are basically symmetrical to the play-back methods. For example, the buffers fill at their respective recording/receiving bit rates, $r_i$, and empty at a rate equal to the difference between the disk rate (writing) and the recording/receiving bit rate, $r_{disk}-r_i$. Here, instead of attempting to prevent buffer underflow, the situation is reversed, and buffer overflow is guarded against. Further, standby mode occurs after the buffers are emptied, rather than after the buffers are refilled.

Figure 6:
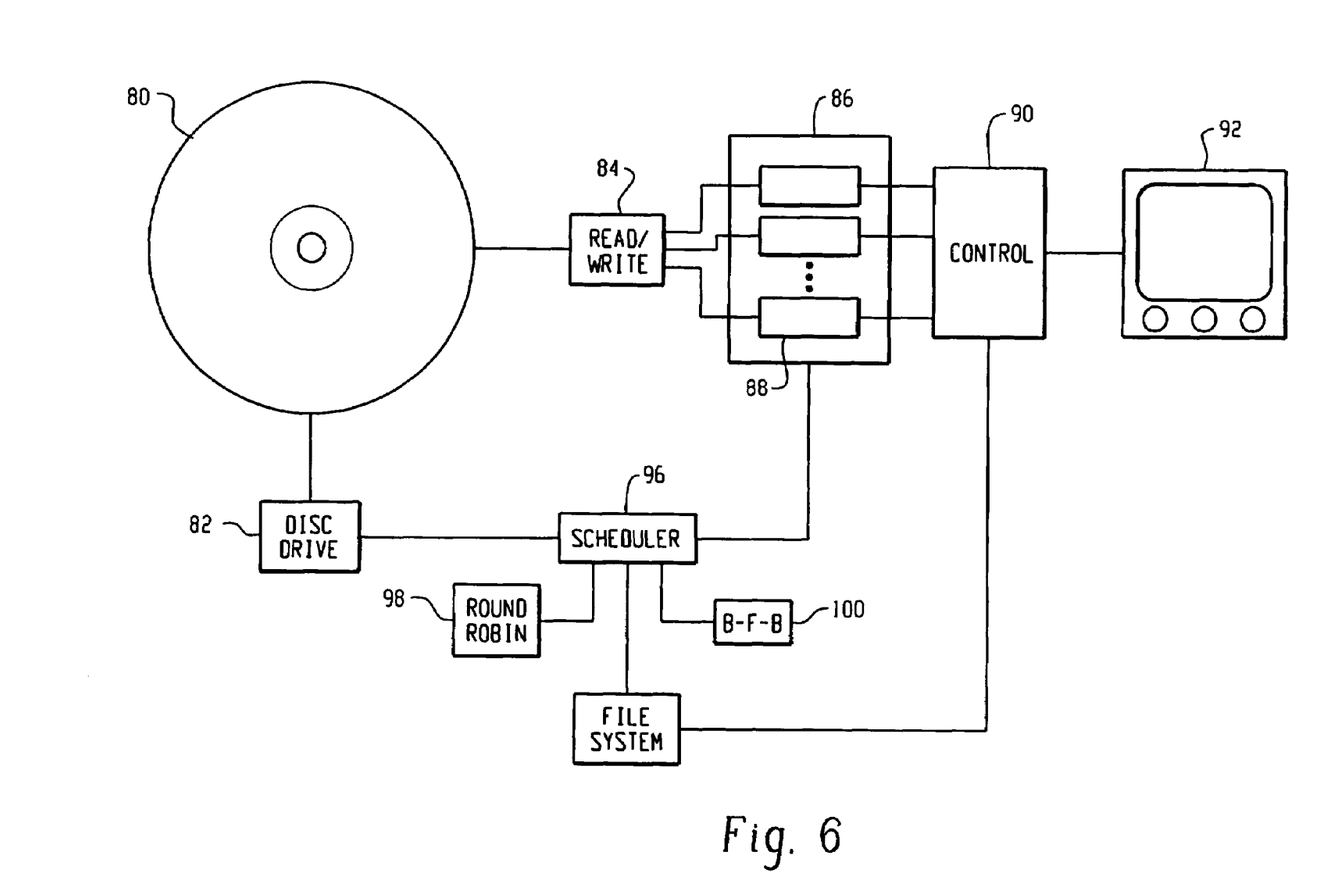
FIG. 6 is a block diagram of a mobile device in accordance with the present invention.

FIG. 6 provides a block diagram of an exemplary mobile device in accordance with the present invention. A disk drive 80 is provided as the storage medium for multimedia content. The disk drive 80 is operated under control of a disk driver 82 that is in communication with a read/write module 84 that issues read, write and control instructions to the disk driver 82. A solid-state memory 86 is provided for partitioning a set of buffers 88, the total solid-state memory being at least m number of bytes. A system controller 90 controls the operation of the mobile device. It controls access to the buffers 88, input/output operations to a user interface 92 and disk access via a file system 94. The user interface 92 has features typical of mobile devices, for displaying multimedia streams and receiving instructions from a user. A scheduling module 96 is provided that incorporates features of the present invention such as the round-robin scheduling module 98, and the BFB algorithm module 100. Although this mobile device is illustrated in an abstracted form, it serves to illustrate a class of devices incorporating embodiments of the present invention.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A battery powered device comprising:
a disk memory;
a means for rotating the disk memory;
a read/write means for at least one of reading and writing streaming data from or to the disk memory;
a buffer memory for storing data read from or to be written to the disk memory, said buffer memory including a plurality of buffer memories associated with a corresponding one of said streaming data allowing concurrent reading and writing, said buffer memory being partitioned into n buffers for n data streams, wherein at least one buffer memory buffers data to be written and at least one buffer memory buffers data that has been read, said plurality of buffer memories being chosen proportional to a maximum bit rate associated with said corresponding streaming data,
an energy saving scheduling means for:
monitoring the buffer memory to determine how long before each of said at least one memory buffer performing a write function is full and to determined how long before each of said at least one of memory buffer memory performing a read function is empty;
adjusting scheduled disk starting and stopping times in accordance with the monitored fullness of each of the plurality of the buffer memories, wherein said adjusting includes at least one of a time based reordering a refilling and emptying of each of said plurality of buffers to remove gaps between filling said memory buffers; and
controlling the disk memory rotating means in accordance with the adjusted schedule, wherein the scheduling means performs the functions of:
spinning up a disk memory;
filling/emptying each stream i of a set S of the n data streams by reading/writing from/to the storage means until the respective stream is full/empty;
determining an earliest next spinning up time $t_0$;
putting the storage means in standby mode thereby spinning down the disk memory;
re-determining, at or just prior to time $t_0$, a new earliest spinning up time $t_k$ based on current buffer fillings $f_i(t)$ at a current time t for each stream i in the set S;
iteratively performing the re-determining the new earliest spinning up time $t_k$ until the time $t_k$ is within a predetermined closeness to $t_{k-1}$ or within a predetermined closeness to the current time t; and,
waiting until time $t_k$, or just prior to time $t_k$.

2. The device as set forth in claim 1 further including:
a Back-Front-Back scheduling process to reorder a refilling/emptying of various buffers and to remove gaps between buffer memory filling intervals.

3. The device as set forth in claim 1 further including:
a system means for controlling access to the memory means;
a means for user input/output, in communication with the controller means;
a means for coherently storing/reading the streams to/from the storage means, in communication with the controller means.

4. The device as set forth in claim 1, wherein the earliest next spinning up time $t_0$ is within at least $M/\Sigma_{j \in S} r_j^{max}$ time units of the current time t, $r_i^{max}$ being a maximum bit rate of the stream i, and m being a total amount of partitioned memory of the n buffers.

5. The device as set forth in claim 4, further including:
a means for examining the latest possible filling/emptying interval, [$s_i,e_i$), for each stream i of the set S in order of non-increasing end time, $s_i$ being a start time for the interval of stream i and $e_i$ being an end time, including:
a means for advancing a preceding filling/emptying interval [$s_j,e_j$) by an advance time $e_j-s_j$ if $e_j>s_j$; and,
a means for re-examining the latest possible filling/emptying interval, [$s_i,e_i$), for each stream i of the set S in order of increasing end time, including:
a means for removing gaps between successive filling/emptying intervals by advancing intervals behind a gap forward in time, a gap existing whenever $s_{j+1}>e_j$.

6. An energy efficient disk scheduling method comprising:
at least one of reading and writing streaming data from/to a disk memory;
buffering the data that is at least one of read from and written to the disk memory, wherein said buffering includes a plurality of buffer memories associated with a corresponding one of streaming data allowing concurrent reading and writing, partitioning the memory M over a set S of n streams, each stream i of the set S being given a partitioned amount of buffer memory, wherein at least one buffer memory buffers data to be written and at least one buffer memory buffers data that has been read, said plurality of buffer memories being chosen proportional to a maximum bit rate associated with said corresponding streaming data;
monitoring the buffered data to determine how long before each of said at least one memory buffer performing a write function is full and to determined how long before each of said at least one of memory buffer memory performing a read function is empty:
adjusting scheduled disk starting and stopping times in accordance with the monitored fullness of each of the buffer memories, wherein said adjusting includes at least a time based reordering one of a refilling and emptying of each of said plurality of buffers to remove gaps between filling said memory buffers; and
scheduling rotation of the disk memory in accordance said adjusted schedule, wherein said scheduling rotation comprises:
spinning up a disk memory;
filling/emptying each stream i of set S by reading/writing from/to the storage means until the respective stream is full/empty;
determining an earliest next spinning up time $t_0$;
putting the storage means in standby mode thereby spinning down the storage means;
re-determining, at or just prior to time $t_0$, a new earliest spinning up time $t_k$ based on current buffer fillings $f_i(t)$ at a current time t for each stream i in the set S;
iteratively performing the re-determining the new earliest spinning up time $t_k$ until the time $t_k$ is within a predetermined closeness to $t_{k-1}$ or within a predetermined closeness to the current time t; and
waiting until time $t_k$, or just prior to time $t_k$.

7. The method as set forth in claim 6, wherein the partitioned amount of memory for each stream i of the set S is approximately $r_i^{max}M/\Sigma_{j \in S}r_j^{max}$, $r_i^{max}$ being a maximum bit rate of the stream i.

8. The method as set forth in claim 6, wherein the earliest next spinning up time $t_0$ is within at least $M/\Sigma_{j \in S}r_j^{max}$ time units of the current time t, $r_i^{max}$ being a maximum bit rate of the stream i.

9. The method as set forth in claim 6, wherein the total amount M of memory is solid-state memory.

10. The method as set forth in claim 6, further including controlling admission of streams to ensure that $\Sigma_{i \in S}r_i^{max}<r_{disk}$, $r_i^{max}$ being a maximum bit rate of the stream i, and $r_{disk}$ being a rate of the storage means.

11. The method as set forth in claim 6, further including pausing between two successive streams, j and j+1 when all subsequent streams j+1, j+2, . . . , n can be delayed.

12. The method as set forth in claim 6, further including:
examining the latest possible filling/emptying interval, [$s_i$, $e_i$), for each stream i of the set S in order of non-increasing end time, $s_i$ being a start time for the interval of stream i and $e_i$ being an end time, including:
advancing a preceding filling/emptying interval [$s_j,e_j$) by an advance time $e_j-s_j$ if $e_j>s_j$; and,
re-examining the latest possible filling/emptying interval, [$s_i,e_i$), for each stream i of the set S in order of increasing end time, including:
removing gaps between successive filling/emptying intervals by advancing intervals behind a gap forward in time, a gap existing whenever $s_{j+1}>e_j$.

13. The method as set forth in claim 12, further including repeatedly applying the examining and re-examining in each of the scheduling cycles.

* * * * *